United States Patent

Gossett et al.

[11] Patent Number: 5,742,277
[45] Date of Patent: Apr. 21, 1998

[54] ANTIALIASING OF SILHOUETTE EDGES

[75] Inventors: Carroll Phillip Gossett, Mountain View; Timothy J. Van Hook, Menlo Park, both of Calif.

[73] Assignee: Silicon Graphics, Inc., Mountain View, Calif.

[21] Appl. No.: 539,956

[22] Filed: Oct. 6, 1995

[51] Int. Cl.$^6$ .................................................. G09G 5/00
[52] U.S. Cl. ........................ 345/136; 345/137; 345/138; 395/131; 395/122; 395/129; 395/135
[58] Field of Search ...................... 345/136, 137, 345/138, 145, 199, 114; 395/131, 135, 129, 122

[56] References Cited

U.S. PATENT DOCUMENTS

| | | | |
|---|---|---|---|
| 3,816,726 | 6/1974 | Sutherland et al. | 235/152 |
| 4,727,365 | 2/1988 | Bunker et al. | 340/728 |
| 4,811,245 | 3/1989 | Bunker et al. | 364/521 |
| 4,843,380 | 6/1989 | Oakley et al. | 345/137 |
| 5,040,130 | 8/1991 | Chang et al. | 345/136 |
| 5,060,172 | 10/1991 | Engelse et al. | 345/136 |
| 5,101,440 | 3/1992 | Watanabe et al. | 345/136 |
| 5,123,085 | 6/1992 | Wells et al. | 395/121 |
| 5,206,628 | 4/1993 | Kelleher | 340/703 |
| 5,245,700 | 9/1993 | Fosum | 395/122 |
| 5,299,300 | 3/1994 | Femal et al. | 345/136 |
| 5,347,618 | 9/1994 | Akeley | 395/121 |
| 5,416,893 | 5/1995 | Herrell et al. | 395/121 |
| 5,430,480 | 7/1995 | Allen et al. | 348/208 |
| 5,528,738 | 6/1996 | Sfarti et al. | 395/143 |
| 5,559,530 | 9/1996 | Yamashita et al. | 345/136 |
| 5,568,596 | 10/1996 | Cawley | 395/131 |
| 5,581,680 | 12/1996 | Sfarti et al. | 395/143 |
| 5,583,974 | 12/1996 | Winner et al. | 395/135 |
| 5,590,254 | 12/1996 | Lippincott et al. | 395/135 |
| 5,594,816 | 1/1997 | Kaplan et al. | 382/275 |

*Primary Examiner*—Steven Saras
*Attorney, Agent, or Firm*—Sterne, Kessler, Goldstein & Fox P.L.L.C.

[57] ABSTRACT

A system and method for antialiasing silhouette edges are described herein. A video interface accesses the frame buffer to retrieve a foreground color of an edge pixel that falls on the silhouette edge. The video interface estimates a background color of the edge pixel based on foreground colors of neighboring pixels that are proximate to the edge pixel. Then, the video interface interpolates between the foreground color and the estimated background color to determine an output color of the edge pixel. Also described herein are a system and method of internal edge antialiasing.

21 Claims, 6 Drawing Sheets

ANTIALIASING OF SILHOUETTE EDGES

BACKGROUND OF THE INVENTION

1. Field of the Invention

The present invention relates generally to computer graphics, and more particularly to antialiasing of silhouette edges.

2. Related Art

In computer graphics, images are formed by selectively combining polygons. These polygons are represented on a display unit's pixel grid.

For example, FIG. 1 depicts a polygon 106 represented on a pixel grid 102 comprising a plurality of pixels 104. Each pixel 104 includes a single sampling point 103. If a pixel's sampling point 103 is enclosed within the polygon 106, then the color of the pixel 104 is set equal to the color of the polygon 106. These pixels 104 having sampling points 103 that are within the polygon 106 collectively represented a rendered polygon 107 (these pixels are shaded in FIG. 1). The rendered polygon 107 is a representation of the polygon 106 in the pixel grid 102.

The polygon 106 shown in FIG. 1 includes three edges, including an actual polygon edge 108. The rendered polygon 107 includes a rendered polygon edge 105 that represents the actual polygon edge 108. The rendered polygon edge 105 does not accurately represent the actual polygon edge 108, since the rendered polygon edge 105 is jagged whereas the actual polygon edge 108 is straight. Accordingly, the rendered polygon edge 105 is not an accurate representation of the polygon 106.

The differences between the polygon 106 and the rendered polygon 107 are due to insufficient pixel sampling. As explained above, each pixel 104 is sampled at a single sampling point 103 to determine whether the pixel is inside the polygon 106 or outside the polygon 106. This sampling procedure leads to errors. For example, as a result of this sampling procedure, pixel 104A is considered to be completely outside of the polygon 106, even though a portion of the pixel 104A is covered by the polygon 106. Similarly, pixel 104B is considered to be completely inside the polygon 106, even though a portion of the pixel 104B is outside of the polygon 106. This effect is called aliasing.

Such aliasing is conventionally alleviated by supersampling. This antialiasing approach is depicted in FIG. 2, which shows the polygon 106 and the pixel grid 102. A second polygon 202 is also shown. This second polygon 202 is underneath the first polygon 106 (in other words, the first polygon 106 is in a first surface and the second polygon 202 is in a second surface). Accordingly, the first polygon 106 represents the foreground (i.e., the surface closest to a viewer), and the second polygon 202 represents the background.

In the example of FIG. 2, each pixel 104 of the pixel grid 102 includes a plurality of supersampling points 130 (specifically, each pixel 104 includes four supersampling points 130). The contribution that the first polygon 106 makes to the color of each pixel 104 is proportional to the number of supersampling points 130 of the pixel 104 enclosed within the first polygon 106. For example, pixel 104A has one of four sampling points enclosed within the first polygon 106. Accordingly, the first polygon 106 makes a 25% contribution to the color of pixel 104A.

The pixel 104A has its remaining three sampling points enclosed within the second polygon 202. Accordingly, the second polygon 202 makes a 75% contribution to the color of pixel 104A.

Accordingly, the color of pixel 104A can be represented as follows:

color pixel 104A=0.25*color of first polygon 106+0.75*color of
second polygon 202      Equation 1

More generally, the color of each pixel 104 can be represented as follows:

pixel color=(percentage of pixel in foreground)*(foreground
color)+(percentage of pixel in background)*(background color)
Equation 2

This relationship in Equation 2 can be easily extended to cases where a pixel is covered by more than two polygons.

In order to achieve supersampling as described above, it is necessary to store a color value for each supersampling point. In other words, it is necessary to store multiple color values for each pixel 104 (this is in contrast to the approach of FIG. 1, where only a single color value need be stored for each pixel 104). For example, assume that the color of the first polygon 106 is red, and the color of the second polygon 202 is green. In this example, supersampling points 204, 206, and 208 in pixel 104A would each have a color value equal to green. Supersampling point 210 would have a color value equal to red. If these supersampling points' color values are not stored, then Equation 2 cannot be solved.

High end, expensive computer graphics systems have the storage capacity to store a color value for each supersampling point, i.e., to store multiple color values for each pixel. However, lower end, less expensive computer graphics systems do not have the storage capacity to store multiple color values for each pixel. The storage capacity in these less expensive computer graphics systems is typically sufficient to store only a single color value per pixel.

Thus, less expensive computer graphics systems cannot employ supersampling techniques to alleviate aliasing. Instead, such less expensive computer graphics systems typically employ non-supersampling techniques such as shown in FIG. 1. Accordingly, the visual quality of lower end, less expensive computer graphics systems is relatively low.

SUMMARY OF THE INVENTION

Briefly stated, the present invention is directed to a computer graphics system including a blend unit, a frame buffer, and a video interface (as well as other components). The blend unit performs internal edge antialiasing. In particular, the blend unit determines if a new polygon being rendered and an existing polygon stored in the frame buffer are in the same surface. If the new polygon and the existing polygon are in the surface, then the blend unit antialiases each edge pixel of the new polygon that falls on an edge of the new polygon.

Such internal edge antialiasing is performed as follows. A coverage value of the edge pixel is added to a coverage value of a corresponding pixel of the existing polygon as stored in a frame buffer entry of the frame buffer. This sum represents a new coverage value. The new coverage value is stored in the frame buffer entry. A new color value is generated by averaging a color value of the edge pixel and a color value of the corresponding pixel proportional to respective coverage values of the edge pixel and the corresponding pixel. The new color value is also stored in the frame buffer entry.

The video interface performs antialiasing of silhouette edges. The video interface operates as follows. The video interface accesses the frame buffer to retrieve a foreground color of an edge pixel that falls on the silhouette edge. The video interface estimates a background color of the edge pixel based on foreground colors of neighboring pixels that are proximate to the edge pixel. Then, the video interface interpolates between the foreground color and the estimated background color to determine an output color of the edge pixel.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a system and method for antialiasing silhouette edges, such as an external edge of a surface. The present invention may be used with a plurality of graphical constructs, such as opaque surfaces, transparent surfaces, decal polygons, lines, texture edges, fake particle systems, fog, etc.

The present invention does not require the storage of multiple color values per pixel to perform silhouette edge antialiasing. Accordingly, the present invention achieves silhouette edge antialiasing with a minimally-sized frame buffer.

Figure 1:
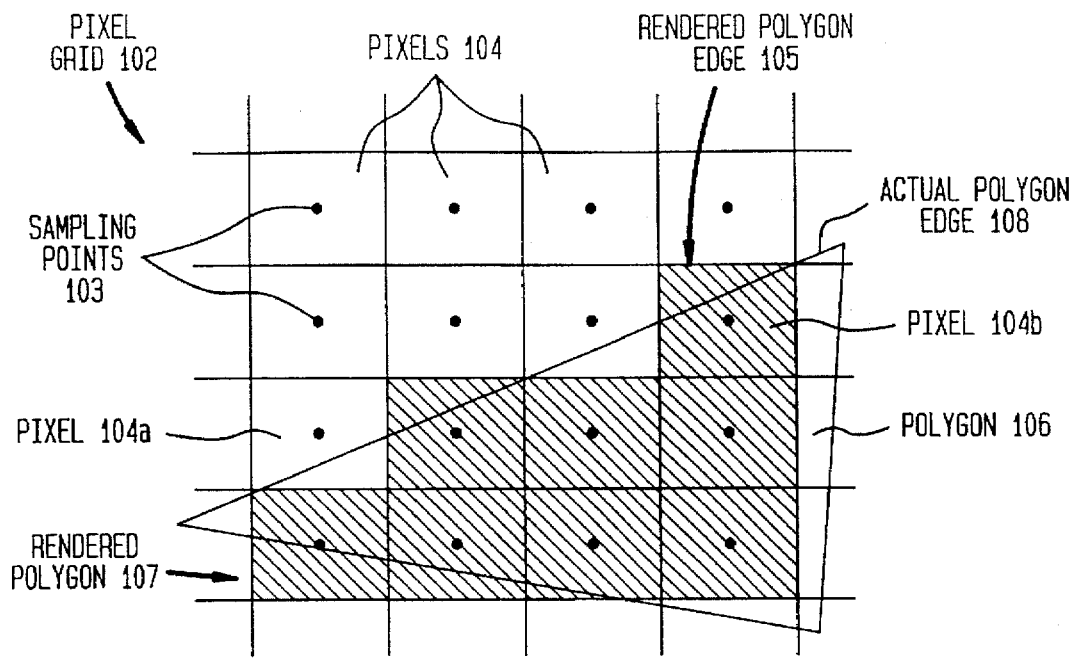
FIGS. 1 and 2 are example pixel grids used to describe the problems solved by the invention.
Figure 2:
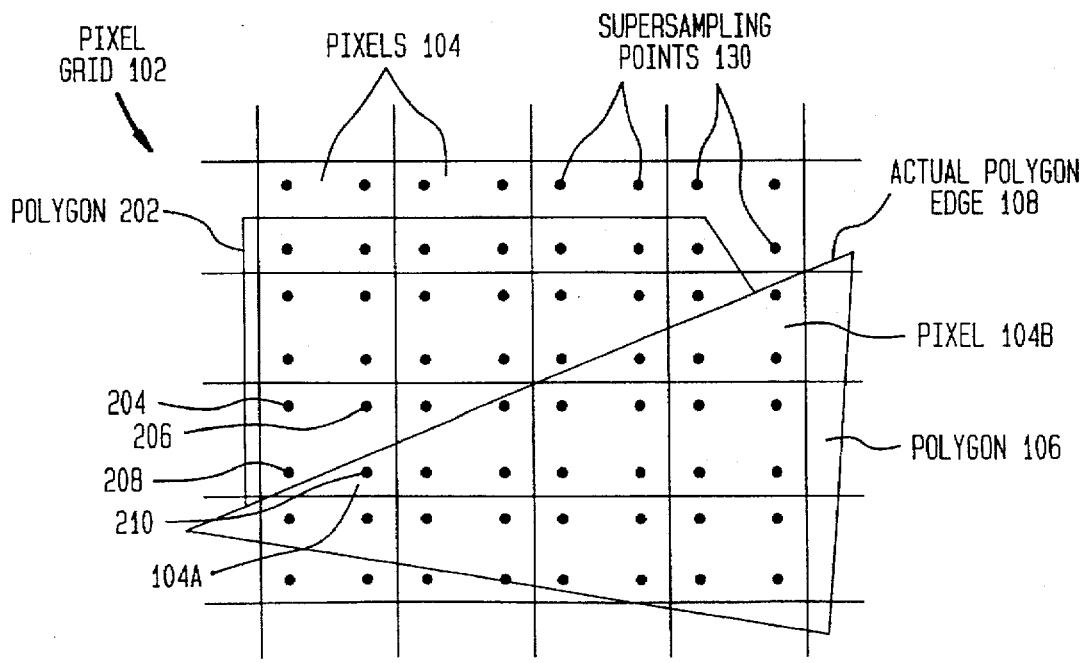
Figure 3A:
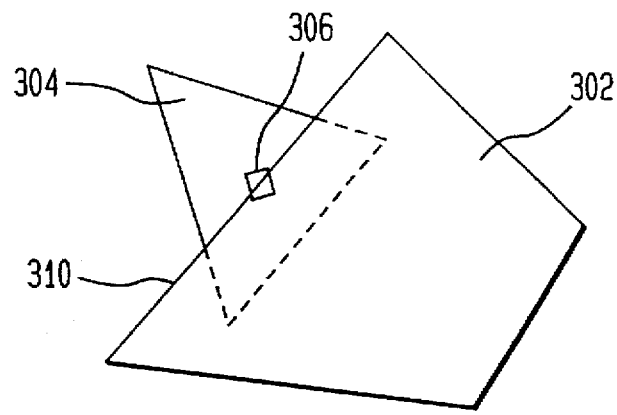
FIGS. 3A and 3B are additional example pixel grids used to describe the functions performed by the invention.

FIG. 3A depicts a first polygon 302 (in a first surface) and a second polygon 304 (in a second surface). The first polygon 302 is on top of the second polygon 304 (from the perspective of a viewer). Accordingly, the first polygon 302 represents the foreground, and the second polygon 304 represents the background.

The first polygon 302 includes an edge 310. Pixel 306 falls on this edge. For reference purposes, pixels that fall on polygon edges (such as pixel 306) are called edge pixels.

Not only is edge 310 an edge of a polygon (i.e., the first polygon 302), but it is also an edge of a surface (i.e., the first surface mentioned in the preceding paragraph). For reference purposes, edge pixels that fall on surface (i.e., silhouette) edges, such as pixel 306, are called external or silhouette edge pixels.

Figure 3B:
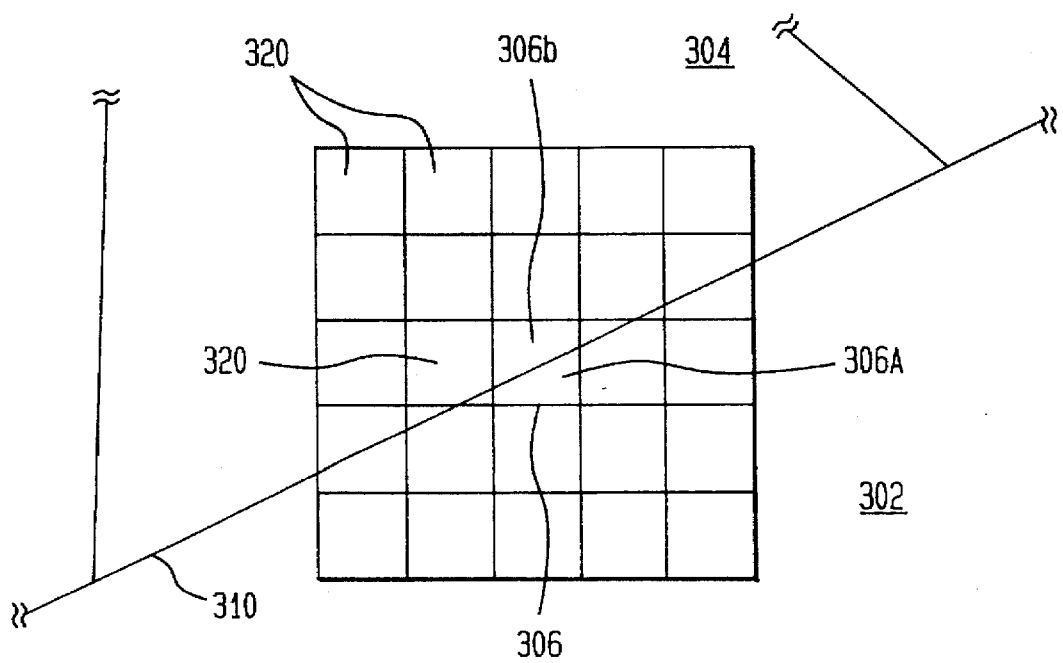

FIG. 3B depicts the scenario of FIG. 3A in greater detail. External edge pixel 306 includes a portion 306A that is enclosed within the first polygon 302, and another portion 306B that is enclosed within the second polygon 304. In other words, portion 306A represents the portion of the external edge pixel 306 within the foreground, and portion 306B represents the portion of the external edge pixel 306 within the background.

Also shown in FIG. 3B are pixels 320 that are proximate to (and, in some cases, directly adjacent to) the external edge pixel 306.

According to the present invention, the color of each external edge pixel (such as external edge pixel 306) is affected by the foreground color and the background color. The contribution of the foreground to the color of an external edge pixel is proportional to the amount of the external edge pixel that is in the foreground. Similarly, the contribution of the background to the color of the external edge pixel is proportion to the amount of the external edge pixel that is in the background. Equivalently, the color of an external edge pixel can be represented as follows:

external edge pixel color=(percentage of pixel in foreground)*(foreground color)+(percentage of pixel in background)*(background color)   Equation 3

As indicated above, the present invention does not store multiple color values per pixel. Instead, the invention stores a single color value per pixel. An advantage of the invention is its ability to solve Equation 3 with this limited amount of stored information.

The invention includes a frame buffer 408 (shown in FIG. 4, which is described further below) that includes a frame buffer entry for each pixel of the video display device 412. The preferred structure of an exemplary frame buffer entry 502 is shown in FIG. 5. The frame buffer entry 502 includes a color value field 504, a coverage value field 506, a Z value field 508, and a delta Z value field 510. Preferably, the color value field 504 and the coverage value field 506 are doubled buffered (front and back). The Z value field 508 and the delta Z value field 510 are single buffered (front only).

The color value field 504 stores therein a color value (preferably a red value, a green value, and a blue value) that identifies the color of the foreground. The coverage value field 506 stores therein a percentage value that identifies the percent to which the pixel in question (i.e., the pixel corresponding to the frame buffer entry 502) falls within the foreground.

For example, suppose that the color of the foreground (i.e., the first polygon 302) is red, and that portion 306A represents 57% of edge pixel 306. In external edge pixel 306's frame buffer entry 502, the color value 504 is set equal to a value that denotes red, and the coverage value 506 is set equal to a value that denotes 57%.

Note that the external edge pixel 306's frame buffer entry 502 does not store any color or coverage values for the background (i.e., the second polygon 304).

The Z value field 508 and the delta Z value field 510 are described below.

Structure of the Invention

Figure 4:
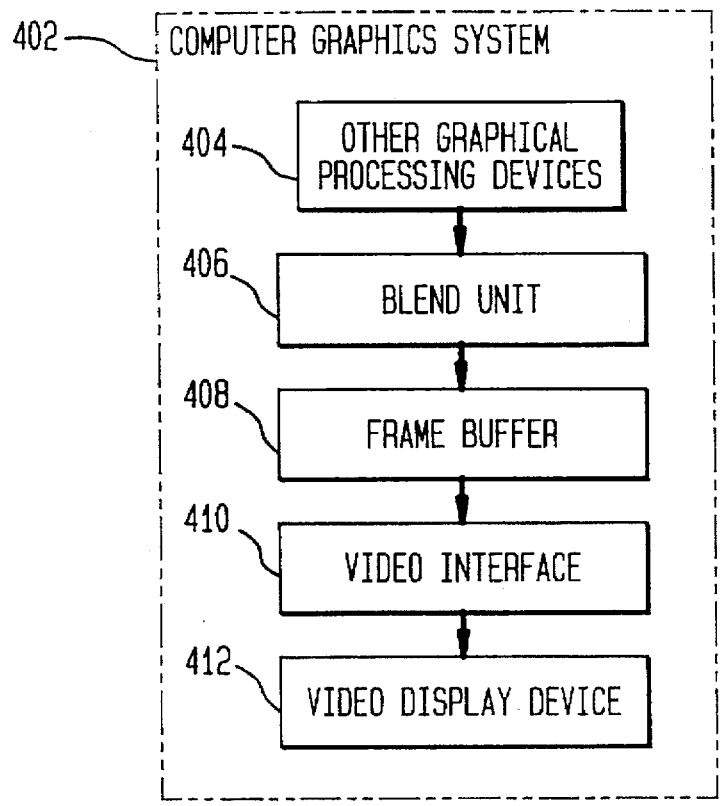
FIG. 4 is a block diagram of a computer graphics system according to a preferred embodiment of the invention.
Figure 5:
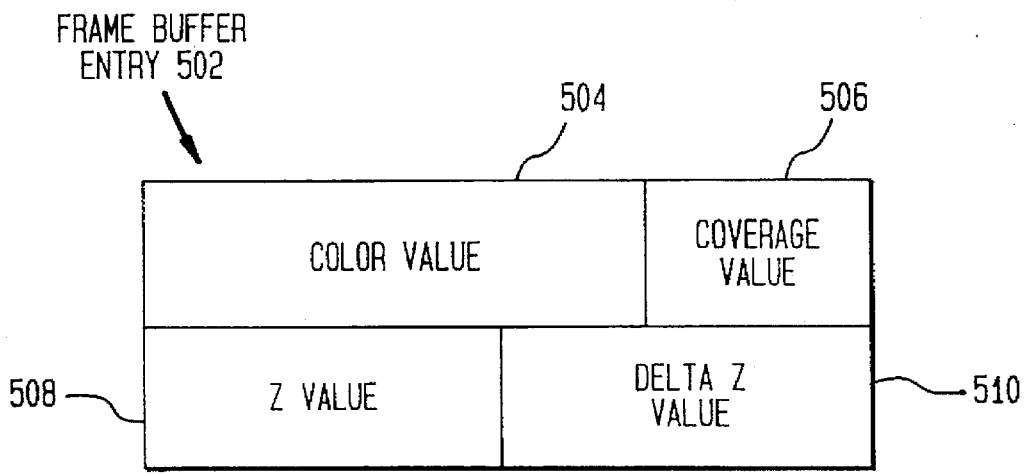
FIG. 5 illustrates the preferred structure of a frame buffer entry.

FIG. 4 is a block diagram of a computer graphics system 402 according to a preferred embodiment of the present invention. The system 402 includes a frame buffer 408 having a frame buffer entry 502 for each pixel of a video display device 412, as described above. Data stored in the frame buffer entries 502 are received by the frame buffer 408 from a blend unit 406, which operates to: (1) provide a new pixel value in the case of a new surface that is clearly in from of the existing (i.e., already in frame buffer 408) surface; (2) blend the new pixel with the old pixel, proportional to their respective coverages, if they are calculated to be within the same surface; or (3) reject the new pixel if it is clearly behind the existing surface. The blend unit 406 receives data from other graphical processing devices 404. Such graphical processing devices 404 are well known.

Data from the frame buffer entries 502 of the frame buffer 408 are transferred to a video interface 410. The video interface 410 processes and then transfers this data to the video display device 412 for display to viewers.

Conventionally, antialiasing of silhouette edges is performed by the blending unit 406. According to the present invention, polygons may be rendered in any order. In other words, polygons are not necessarily rendered from back to front (from the perspective of the viewer) (in other words, polygons are not necessarily rendered in depth-sorted order). Under these circumstances, unwanted artifacts may be produced if silhouette edge antialiasing is performed by the blending unit 406.

The discussion above focused on external surface edges, i.e., polygon edges that represent the edges (also called silhouettes) of surfaces. As will be appreciated, a surface may be composed of multiple polygons. Edges of these polygons that do not represent edges of the surfaces are called internal edges.

Consider an internal edge of a surface that is formed by two polygons of the surface. Suppose that silhouette edge antialiasing is performed by the blend unit 406. When the first of these two polygons is rendered, the blend unit 406 does not know whether the edge is an external (silhouette) edge (and hence needs to be blended with the background), or an internal edge (and hence should not be blended with the background). If an internal edge is blended with the background, then a line along the edge will be formed once the second polygon is blended with the first. There is no way to remove this line.

Thus, according to the present invention, silhouette edge antialiasing is preferably postponed until after the blend unit 406 has rendered the whole scene. Preferably, final blending of the silhouette edges (i.e., the performance of silhouette edge antialiasing) is performed at display time by the video interface 410.

It is noted that blend units, frame buffers, video interfaces, and video display devices are all generally well known devices. Accordingly, the following discussion is limited to aspects of the blend unit 406, frame buffer 408, video interface 410, and video display device 412 that are pertinent to the present invention.

Approach of the Invention

The invention preferably determines a color value of each external (silhouette) edge pixel by interpolating between the foreground color and the background color. This interpolation is represented in Equation 3, above. Recall that the frame buffer 408 only stores a coverage value and a color value for the foreground. Equation 3 can be rewritten as follows to best utilize this stored information:

external edge pixel color=$cvg$*foreground color+(1−$cvg$)*(background color)  Equation 4

In this equation, cvg is equal to the foreground coverage value (i.e., the percent to which the external edge pixel falls in the foreground).

The background color is not stored in the frame buffer 408. Accordingly, the challenge faced by the inventors was to develop an approach to determine a representation of the background color (the background was overwritten during the rendering process performed by the blend unit 406).

The present invention analyzes the neighboring pixels of the external edge pixel in question (i.e., the external edge pixel whose color is being determined in accordance with Equation 4) to determine a representation of the background color.

One approach is to look at the z-buffer (assuming the image was rendered with z-buffering turned on) to distinguish between foreground and background pixels (perhaps by using the neighboring pixel with the largest z as representative of the background). However, if this is done, then the video interface 410 would have to read the Z-buffer, which would add to the memory bandwidth required. Even worse, this would require double buffering of Z, since if it is being used at display time, it cannot be allowed to be overwritten by the rendering of the next frame. However, given that the memory used for the frame buffer 408 is small, this would be prohibitive. So again, the problem is to find a representative for the background without using depth information, using only the foreground color and coverage values for each pixel and its neighbors.

The inventors have determined that the use of only foreground color and coverage values for each silhouette edge pixel and its neighbors to determine a representation of the pixel's background can be done to a reasonable approximation, assuming relative constancy of color within neighboring pixels of the foreground and relative constancy of color within neighboring pixels of the background. Note that this must be assumed for the background, since the true background for a foreground pixel has already been overwritten. Errors in this assumption tend to not be noticeable, since they are consistent with "edge effects" (diffraction, etc.). Note also that this assumption of color constancy tends to be true for foreground objects, even for textured objects, since by mipmapping, pixels near the silhouette of an object (which are the only pixels altered by the display time antialiasing in the video interface) tend to be free of high spatial frequencies tangentially as well as radially (since mipmapping gives no directionality to the level of detail).

Operation of the Invention

Figure 6:
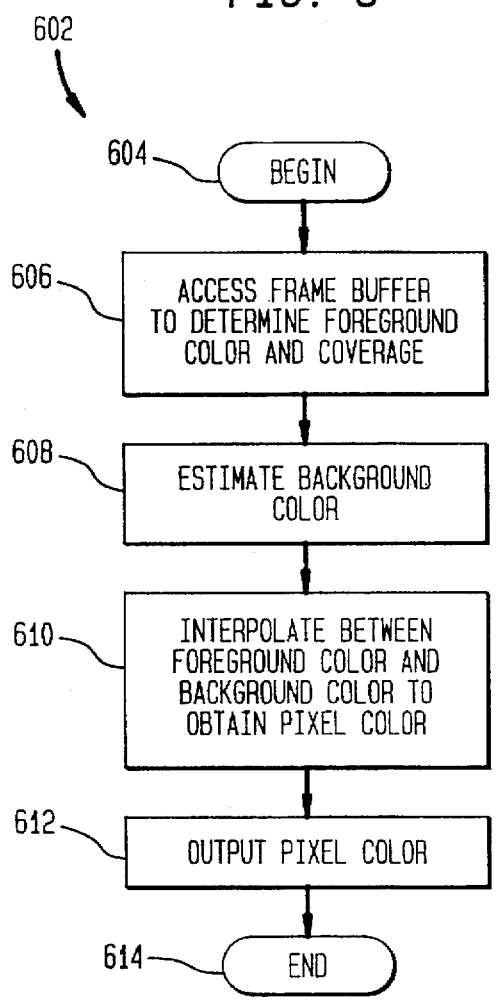
FIGS. 6, 7, and 10 are flowcharts depicting the preferred operation of the invention.

The operation of the present invention shall now be described in detail with reference to a flowchart 602 shown in FIG. 6. Flowchart 602 represents the operation of the invention when antialiasing silhouette edges. More particularly, flowchart 602 represents the operation of the invention when determining the color of an external (silhouette) edge pixel (for reference purposes, this external edge pixel is called the "central pixel"). Preferably, the video interface 410 performs the steps of flowchart 602. Flowchart 602 begins with step 604, where control immediately passes to step 606.

In step 606, the video interface 410 accesses the frame buffer 408 to determine the foreground color and the foreground coverage of the central pixel. Step 606 is performed by retrieving the values stored in the color value field 504 and the coverage value field 506 in the frame buffer entry 502 corresponding to the central pixel.

Figure 7:
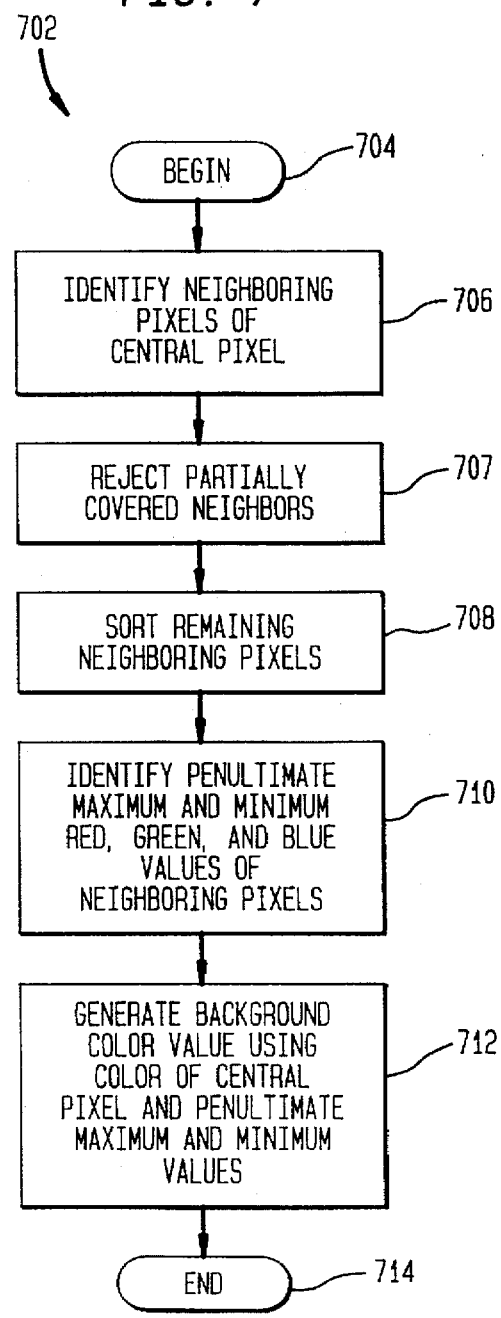

In step 608, the video interface 410 estimates the background color of the central pixel based on stored, or foreground, colors of the neighboring pixels. Flowchart 702 in FIG. 7 represents the manner in which step 608 is performed according to a preferred embodiment of the present invention. Flowchart 702 begins with step 704, where control immediately passes to step 706.

Note that there are many possible ways to estimate the background color based on stored, or foreground, colors of the neighboring pixels. The technique described below is only one method for doing so. Many alternative techniques are possible, including but not limited to using different neighborhoods and/or different estimation functions.

In step 706, the video interface 410 identifies the neighboring pixels of the central pixel. The "neighboring pixels" are a subset of the pixels proximate to the central pixel. What constitutes a neighboring pixel is further discussed below.

In step 707, all partially covered neighbors are rejected. A "partially covered neighbor" is a pixel that is partly in the foreground, and partly in the background. For the remaining discussion of flowchart 702 in FIG. 7, the term "neighbors" includes only fully covered neighbors (i.e., in the following discussion, "neighbors" does not include the neighbors rejected in step 707).

In step 708, the video interface 410 sorts the neighboring pixels independently by their foreground RGB (red/green/blue) color component. In other words, the video interface 410 creates three logical lists of the neighboring pixels, the first sorted by the foreground red color component, the second sorted by the foreground green color component, and the third sorted by the foreground blue color component.

In step 710, the video interface 410 rejects the maximum and minimum values of each color component. The remaining maximum and minimum values of each color component are called the penultimate maximum and minimum values. For example, suppose the sorted list for the color red was as follows (this list resulted from performing step 708): {79, 101, 152, 205, 233, 244}. The video interface 410 in step 710 rejects 79 (the minimum value for red) and 244 (the maximum value for red), and selects 101 (the remaining minimum value for red) and 233 (the remaining maximum value for red) as the penultimate minimum and maximum values for red.

In step 712, the video interface 410 generates an estimated background color value using the foreground color value of the central pixel (determined in step 606) and the red, green, and blue penultimate maximum and minimum values for the central pixel's neighboring pixels. Step 712 is performed as follows.

First, for each color component, the maximum of the central pixel foreground color value and the penultimate maximum value is determined. For example, if the central pixel's red value is equal to 241, then the central pixel's red value is used in the following operations (since 241 is greater than 233, which is the penultimate maximum value for red in the above example).

Second, for each color component, the minimum of the central pixel foreground color value and the penultimate minimum value is determined. For example, if the central pixel's red value is equal to 241, then the penultimate minimum value for red is used in the following operations (since 241 is greater than 101, which is the penultimate minimum value for red in the above example).

Third, the maximum value and the minimum value (as identified in the prior two steps) for each color component are averaged. In above example, 241 and 101 are averaged to obtain an average red component value of 171. As a result of this step, an average red value, an average green value, and an average blue value are obtained. These average values represent a color half way between the foreground and background.

Fourth, the video interface 410 subtracts the average color from the central pixel's foreground color (on a color component by color component basis). This represents half the magnitude of the difference between the foreground and background colors. In the above example, the average color of red is 171 and the central pixel's foreground red color value is 241. Thus, in this step 171 is subtracted from 241 to obtain a value of 70, which represents half the magnitude of the difference between the foreground and background red color.

Fifth, the video interface 410 doubles this difference, and subtracts it from the central pixel's foreground color (on a color component by color component basis). This value is the preferred estimate of the background color. Thus, in this step the red difference value of 70 is doubled to obtain 140. This value of 140 is subtracted from 241 (the central pixel's foreground red color value) to obtain a value of 101, representing the preferred estimate of the background red color.

Step 712 is equivalently performed as follows. First, the penultimate minimum and maximum values for each color are summed. This sum represents an estimate sum of the foreground color and the background color. Second, the central pixel's foreground color is subtracted from this sum, to thereby obtain the estimate of the background color. For the above example, 101 (the penultimate minimum value for red) and 233 (the penultimate maximum value for red) are summed to obtain 334, representing an estimate sum of the foreground red color and the background red color. Then, a value of 241 (the central pixel's foreground color) is subtracted from this sum, to thereby obtain a value of 93, representing the estimate of the background red color.

Referring again to FIG. 6, in step 610 the video interface 410 interpolates between the foreground color (obtained in step 606) and the estimated background color (estimated in step 608) to determine the color of the central pixel (this is also called the "output color" of the central pixel). Step 610 is performed by solving Equation 4, where cvg (the foreground coverage value) was previously obtained in step 606.

In step 612, the video interface 410 outputs the color of the central pixel to the video display device in a well known manner.

Flowchart 602 is complete after step 612 is performed, as indicated by step 614. It is noted that flowchart 602 is performed for each external edge pixel.

It should be noted that all the operations discussed above (maximum, minimum, averaging, etc.) are continuous and monotonic (although nonlinear). These properties insure that there is not excessive "popping" of whatever artifacts there may be as objects move across the pixel grid.

Neighboring Pixels

The algorithm discussed above is somewhat sensitive to the choice of a neighborhood. In small neighborhoods (4 neighbors or less), there are not enough samples to be able to insure that there will always be a fully covered pixel represented within the neighborhood. On the other hand, in the more highly connected neighborhoods (such as 3 by 3 with 8 neighbors), the fact that some (orthogonal) neighbors are significantly closer than the other (diagonal) neighbors introduces a bias, creating unacceptable artifacts.

The ideal case is to have a triangular grid, with each pixel having generally 6 neighbors, all equidistant (so no bias). This ideal situation is not possible, however, in cases where rendering is being done on a square (or at least rectangular) grid.

The inventors have determined that a triangular grid can be approximated by "checkerboarding" the pixels. If you only consider the neighboring squares on a checkerboard that are of the same color, you can get a slightly deformed triangular grid. (This deformation turns out to not be problematic, since anything that correctly antialiases something on one rectangular grid should also work on another rectangular grid with a different aspect ratio.)

Figure 11:
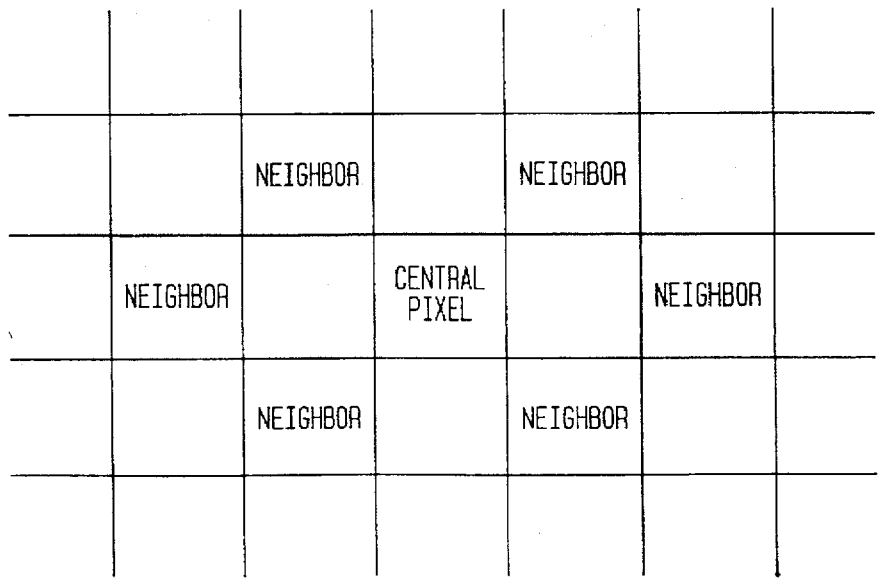
FIG. 11 illustrates the spatial relationship of a central pixel and its neighboring pixels.

The preferred neighborhood is shown in FIG. 11, depicting the central pixel and the neighboring pixels (indicated as "neighbor" in FIG. 11). Note that in the case of interlace, since we are only rendering one field at a time, the rows of neighbors above and below are actually from 2 lines away. Note that this simply deforms the triangular grid the other way, and so is not really any different.

Processing of Internal Edges

Figure 8:
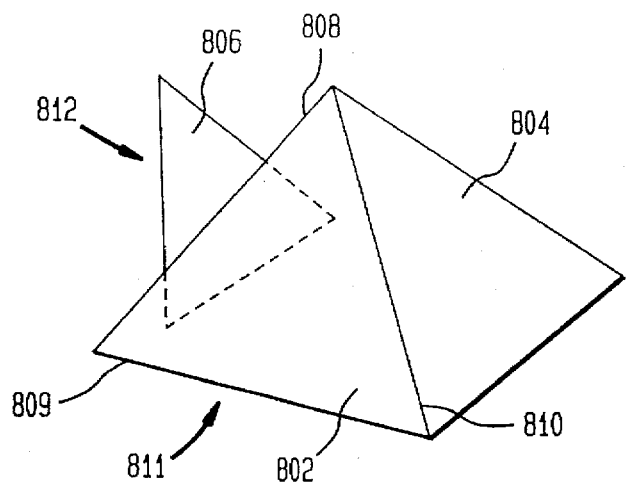
FIG. 8 is used to describe the differences between external and internal edges.

FIG. 8 illustrates a first surface 811 composed of two polygons 802, 804, and a second surface 812 composed of a single polygon 806. The first surface 811 is the foreground, and the second surface 812 is the background. Polygon 802 has two external (silhouette) edges 808, 809 and one internal edge 810 that is common with polygon 804. For the reasons discussed above, external edges (such as edges 808, 809) should be antialiased in the manner discussed above, but internal edges (such as edge 810) should not be antialiased.

In order to differentiate between external and internal edges, the invention stores a Z value in the Z value field 508 of each frame buffer entry 502 (FIG. 5). The invention also stores a delta Z value in the delta Z value field 510 of each frame buffer entry 502.

A pixel's Z value represents the perpendicular distance from the pixel to an image plane, such as the display screen of a monitor. A pixel's delta Z value is a measure of the extent to which the Z value is changing in the vicinity of the pixel.

Figure 9:
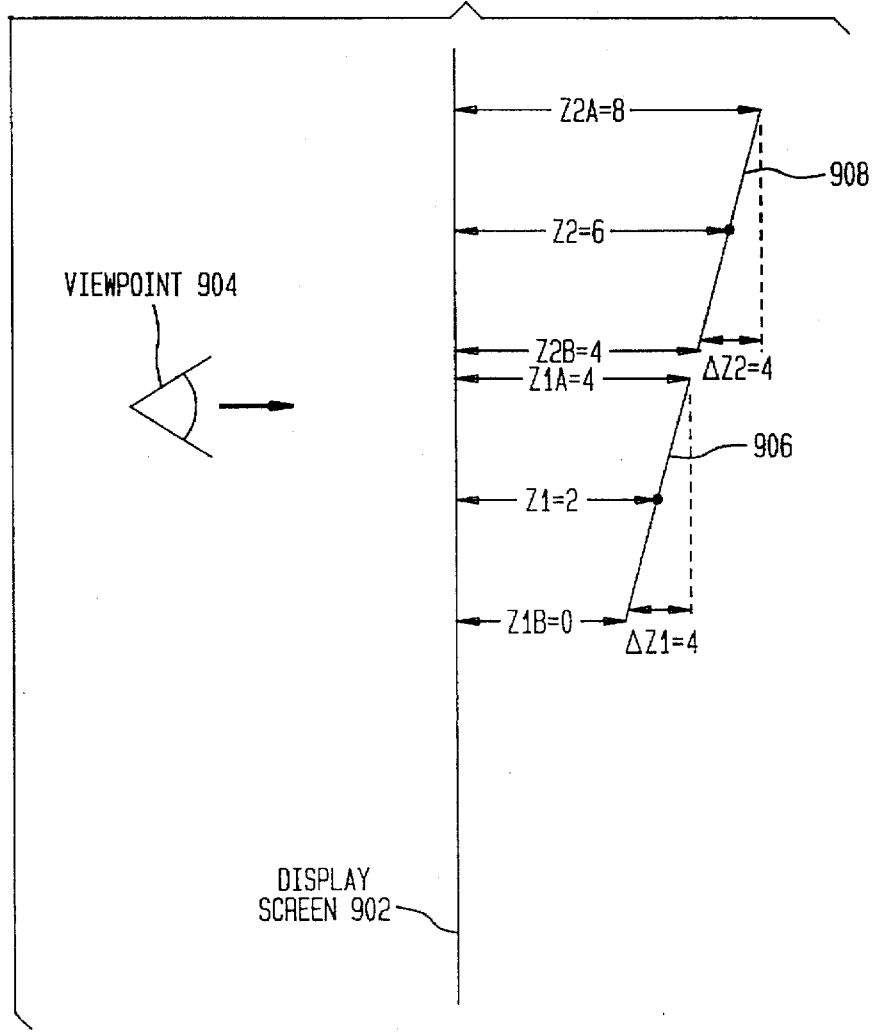
FIG. 9 is used to describe the manner in which the invention differentiates between external and internal edges.

For example, consider an example scenario presented in FIG. 9. A first pixel 906 and a second pixel 908 are shown. The first pixel 906's Z value, denoted as Z1, is equal to 2. Note that, preferably, Z is measured from the center of each pixel. The first pixel 906's delta Z value, denoted as $\Delta Z1$, is equal to 4, indicating that the value of Z changes by 4 over the length of the first pixel 906.

Thus, it is possible to determine the Z values for the two ends of the first pixel 906. Specifically, the Z value of one end, denoted by Z1B, is equal to 0, whereas the Z value of the other end, denoted by Z1A, is equal to 4.

Consequently, by straightforward manipulation of a pixel's Z value and delta Z value, it is possible to determine the extent to which the pixel ranges over Z. For example, the Z range of pixel 906 is 0 to 4. The Z range of pixel 908 is 4 to 8.

According to the present invention, two polygons are considered to be in the same surface if they overlap. The invention determines whether two polygons overlap by reference to Z values and delta Z values. Specifically, if the Z ranges of edge pixels in two polygons overlap, then the polygons are considered to be in the same surface.

Consider the scenario of FIG. 9. Assume that pixel 906 is in one polygon and pixel 908 is in another polygon. As noted above, the Z range of pixel 906 is 0 to 4, and the Z range of pixel 908 is 4 to 8. Thus, the Z ranges of these two pixels 906, 908 overlap. Accordingly, the surfaces in which these pixels 906, 908 exist overlap. Since they overlap, the edge between pixels 906 and 908 represents an internal edge, not an external edge.

One additional qualification is done to prevent blending of surfaces which are close in Z, but not contiguous. If the sum of the coverage values of the old and the new pixel is greater than unity, then the new pixel (if it is in front) is taken to be part of a new contiguous surface and completely overwrites the old pixel.

Figure 10:
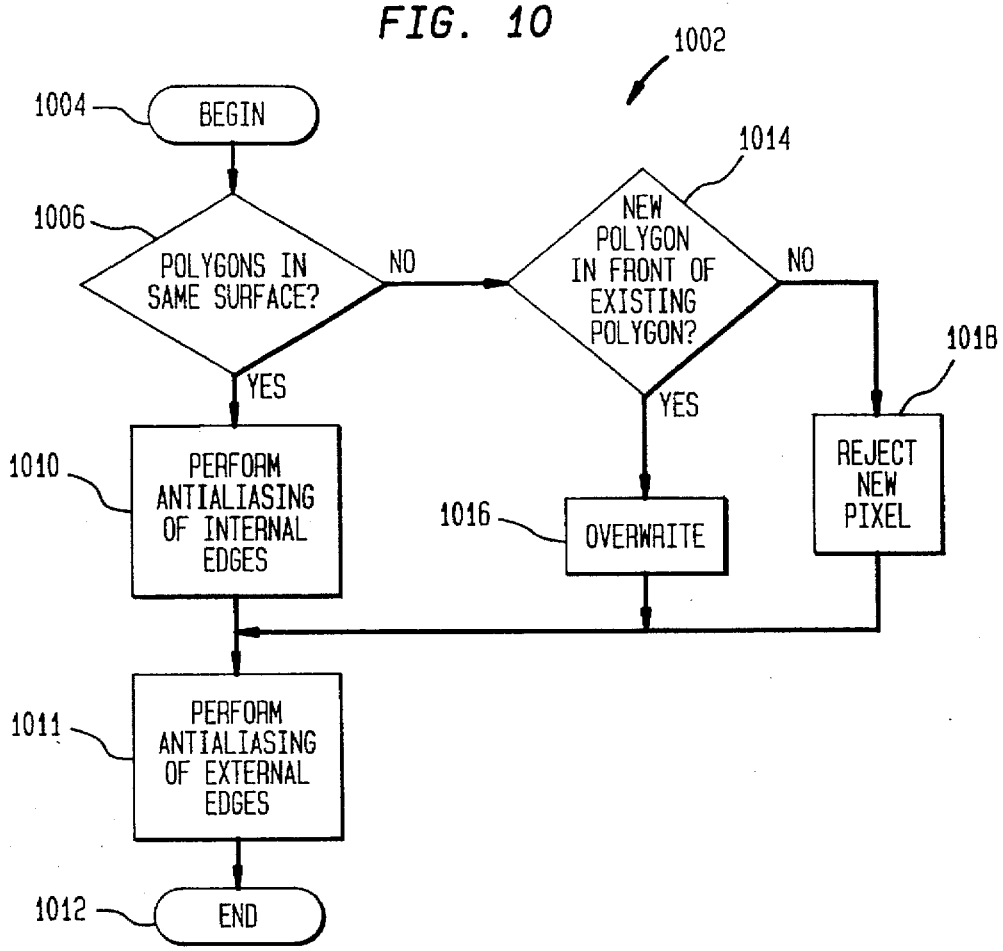

FIG. 10 presents a flowchart 1002 that represents the operation of the invention when antialiasing internal edges. It is noted that the steps of flowchart 1002 are preferably performed by the blend unit 406. The blend unit 406 performs the steps of flowchart 1002 before the video interface 410 antialiases external edges. In performing the steps of flowchart 1002, the blend unit 406 determines and stores color and coverage values in the frame buffer 408. These color and coverage values are later used by the video interface 410 when antialiasing external edges in the manner described above. (It is noted that coverage values in the frame buffer 408 are initialized such that each pixel is taken to be completely covered by the foreground.)

The two polygons being processed in flowchart 1002 are: (1) the polygon already stored in the frame buffer 408 (i.e., stored in the frame buffer 408 prior to the performance of step 1006); this polygon is called the "existing polygon" for reference purposes; and (2) the polygon (called the "new polygon") that is being rendered to at least a portion of the memory area in the frame buffer 408 already occupied by the existing polygon.

Referring now to FIG. 10, the blend unit 406 in step 1006 determines whether the new polygon and the existing polygon are in the same surface. This is done by determining whether the respective Z ranges of the existing and the new polygons overlap (in the manner discussed above). More particularly, the blend unit 406 in step 1006 determines whether the new polygon's pixel that is currently being rendered overlaps with the corresponding existing polygon's pixel as stored in the frame buffer 408.

If they do overlap, then these two pixels are along an internal edge formed between the new polygon and the existing polygon. In this case, antialiasing of this internal edge is performed in step 1010 by summing the coverage value of the new polygon's pixel and the coverage value of the corresponding existing polygon's pixel. This new coverage value is stored in the coverage value field 506 of the appropriate frame buffer entry 502 (i.e., the frame buffer entry 502 corresponding to the existing polygon's pixel).

Also, a new color value is generated by averaging the color values of the two pixels proportional to the coverage values of the two pixels. This new color value is stored in the color value field 504 of this frame buffer entry 502. Specifically, the new color value is generated as follows:

new color value=(color value of existing polygon's pixel)*(coverage value of existing polygon's pixel)+(color value of new polygon's pixel)*(coverage value of new polygon's pixel)

Any edge pixels which are not ultimately fully covered by this iterative process represent silhouette edges, and are anti-aliased by the video interface 410 in the manner discussed above.

If it is determined in step 1006 that the two polygons are not in the same surface, then step 1014 is performed. The blend unit 406 in step 1014 determines whether the new polygon is in a surface that is in front of the surface containing the existing polygon (by reference to their Z values). If the new polygon's surface is in front of the existing polygon's surface, then step 1016 is performed.

In step 1016, the color value and the coverage value of the new polygon's pixel being rendered are stored in the color value field 504 and the coverage value field 506 of the appropriate frame buffer entry 502 (i.e., the frame buffer entry 502 corresponding to the existing polygon's pixel). In effect, the existing polygon's pixel has been overwritten.

If the blend unit 406 in step 1014 determines that the new polygon's surface is behind the surface containing the existing polygon, then the new polygon's pixel is rejected (i.e., it is not used to update the frame buffer 408).

The operations of steps 1006, 1010, 1014, 1016, and 1018 are performed for each pixel in each polygon being rendered by the blend unit 406. After such operation of the blend unit 406, antialiasing of external edges is performed by the video interface 410 in the manner described above. This is represented by step 1011 in FIG. 1002.

Before final processing, one more operation is done (optionally) to the antialiased pixels, to fix up some possible, slight artifacts of the algorithm. For any pixels on or adjacent to a silhouette edge, the video interface 410 takes the median of three adjacent pixels as the color to be displayed in place of the center pixel. For any single silhouette, this will always leave the pixels essentially undisturbed, while filtering out the "divots" (one pixel notches) due to multiple overlapping silhouettes. This simple circuit effectively eliminates most of the divot artifacts. Note that this median filter is not used in regions of full coverage, so high spatial frequency textures within a surface will not be distributed by this operation.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of antialiasing a silhouette edge, the silhouette edge representing an edge of a polygon which is coincident with an edge of a surface on which the polygon is located, the method comprising the steps of:

(1) retrieving a color value for a silhouette edge pixel which falls on the silhouette edge from a frame buffer, the retrieved color value representing a color of one or more foreground polygons which fall within the silhouette edge pixel;

(2) estimating a background color of the silhouette edge pixel based on colors of neighboring pixels that are proximate to the silhouette edge pixel, the estimated background color representing a color of a portion of the silhouette edge pixel which is not occupied by the one or more foreground polygons; and (3) determining an output color of the silhouette edge pixel by interpolating between the retrieved color and the estimated background color.

2. The method of claim 1, wherein step (1) comprises:

(a) prior to retrieving the color for the silhouette edge pixel from the frame buffer, storing in the frame buffer only information associated with the one or more foreground polygons and not storing color information associated with any background polygons.

3. The method of claim 1, wherein step (2) comprises the steps of:

(a) identifying neighboring pixels of the silhouette edge pixel;

(b) rejecting any of the neighboring pixels which are silhouette edge pixels;

(c) determining a penultimate maximum value and a penultimate minimum value for each color component of the neighboring pixels which were not rejected in step (b); and (d) estimating the background color of the silhouette edge pixel based on the retrieved color, the penultimate maximum value of each non-rejected neighboring pixel and the penultimate minimum value of each non-rejected neighboring pixel.

4. The method of claim 3, wherein step (c) comprises the steps of:

(i) generating a list of color values for each color component of the neighboring pixels which were not rejected in step (b);

(ii) rejecting a maximum color value and a minimum color value contained in each of the lists; and (iii) for each of the lists, setting the penultimate maximum value equal to a remaining maximum value in each of the lists and setting the penultimate minimum value equal to a remaining minimum value in each of the lists.

5. The method of claim 4, wherein step (d) comprises the steps of:

(i) generating a color value sum for each color component of the non-rejected neighboring pixels by adding the penultimate maximum value for each of the color components of the non-rejected neighboring pixels to the penultimate minimum value for each of the color components of the non-rejected neighboring pixels; and (ii) estimating the background color of the silhouette edge pixel by subtracting a color value of each color component of the retrieved silhouette edge pixel color from a corresponding color value sum of the non-rejected neighboring pixels.

6. The method of claim 1, wherein step (3) comprises the steps of:

(a) retrieving a coverage value stored in the frame buffer representing an area of the silhouette edge pixel occupied by the one or more foreground polygons; and (b) determining the output color of the edge pixel as follows: retrieved silhouette edge pixel coverage value*retrieved silhouette edge pixel color)+(1-retrieved silhouette edge pixel coverage value) *estimated background color.

7. The method of claim 4, wherein step (d) comprises the steps of:

(i) determining a maximum color value by selecting the larger of the retrieved silhouette edge pixel color and the penultimate maximum value;

(ii) determining a minimum color value by selected the smaller of the retrieved silhouette edge pixel color and the penultimate minimum value;

(iii) determining an average color by averaging the maximum color value with the minimum color value for each color component;

(iv) determining a difference value by subtracting the average color from the retrieved silhouette edge pixel color;

(v) estimating the background color of the silhouette edge pixel by multiplying the difference value by two and subtracting the result from the retrieved silhouette edge pixel color.

8. A method of antialiasing an internal edge and a silhouette edge, the internal edge representing coincident edges of same-surface polygons which edges are not coincident with an edge of the same-surface, the silhouette edge representing an edge of a polygon which is coincident with an edge of a surface on which the polygon is located, the method comprising the steps of:

(1) determining if a portion of a new polygon which falls within a pixel is in a same surface with a portion of an existing polygon which falls within the pixel and for which information is stored in a frame buffer entry associated with the pixel; and (2) if the portion of the new polygon and the portion of the existing polygon are in the same surface, then antialiasing the pixel as an internal edge pixel;

wherein step (2) comprises the steps of:

(a) retrieving a coverage value from the frame buffer entry, the retrieved coverage value representing an area of the internal edge pixel which is occupied by the portion of the existing polygon which falls within the internal edge pixel;

(b) generating a new coverage value by summing the retrieved coverage value with a coverage value of the new polygon representing an area of the internal edge pixel which is occupied by the portion of the new polygon which falls within the internal edge pixel;

(c) storing the new coverage value in the frame buffer entry;

(d) generating a new color value by averaging a color value of the portion of the new polygon and a color value of the portion of the existing polygon proportional to their respective coverage values; and (d) storing the new color value in the frame buffer entry.

9. The method of claim 8, wherein step (1) comprises the steps of:

(a) determining a Z-range of the portion of the existing polygon by reference to a Z value and a delta Z value associated with the portion of the existing polygon;

(b) determining a Z-range of the portion of the new polygon by reference to a Z value and a delta Z value associated with the portion of the new polygon; and (c) determining that the portion of the new polygon and the portion of the existing polygon are in the same surface if the Z-range of the portion of the new polygon overlaps with the Z-range of the portion of the existing polygon.

10. The method of claim 8, further comprising the steps of:

(3) if it is determined in step (1) that the portion of the new polygon and the portion of the existing polygon are not in the same surface, then determining whether the portion of the new polygon is in a surface which is in front of a surface containing the portion of the existing polygon;

(4) if the portion of the new polygon is in a surface which is in front of a surface containing the portion of the existing polygon, then storing a coverage value and a color value for the portion of the new polygon in the frame buffer entry; and (5) if the portion of the new polygon is not in a surface which is in front of a surface containing the portion of the existing polygon, then rejecting information associated with the portion of the new polygon for the internal edge pixel.

11. The method of claim 8, further comprising the steps of:

(3) retrieving a color value stored for a silhouette edge pixel from the frame buffer, the retrieved color representing a color of one or more foreground polygons which fall within the silhouette edge pixel;

(4) estimating a background color of the silhouette edge pixel based on colors of neighboring pixels which are proximate to the silhouette edge pixel, the estimated background color representing a color of a portion of the silhouette edge pixel which is not occupied by the one or more foreground polygons; and (5) interpolating between the retrieved color and the estimated background color to determine an output color of the silhouette edge pixel.

12. A system for antialiasing a silhouette edge, the silhouette edge including an edge of a polygon which is coincident with an edge of a surface on which the polygon is located, comprising:

a frame buffer for storing pixel color information; and a video interface for antialiasing silhouette edge pixel data stored in said frame buffer, comprising:

frame buffer accessing means for accessing said frame buffer to retrieve a color of a silhouette edge pixel;

background color estimating means for estimating a background color of the silhouette edge pixel based on colors of neighboring pixels that are proximate to the silhouette edge pixel; and means for generating an output color for the silhouette edge pixel based on the retrieved color and the estimated background color, comprising means for interpolating between the retrieved color and the estimated background color.

13. The system of claim 12, wherein said frame buffer only stores foreground polygon information and does not store background polygon information.

14. The system of claim 12, wherein said background color estimating means comprises:

means for identifying neighboring pixels of the silhouette edge pixel;

means for rejecting any of the neighboring pixels which are silhouette edge pixels;

penultimate identifying means for identifying a penultimate maximum value and a penultimate minimum value for each foreground color component of the neighboring pixels that were not rejected by said means for rejecting neighboring pixels; and estimating means for estimating the background color of the silhouette edge pixel based on the retrieved color of the silhouette edge pixel, the penultimate maximum value and the penultimate minimum value.

15. The system of claim 14, wherein said penultimate identifying means comprises:

means for generating a list of color values for each retrieved color component of the neighboring pixels which were not rejected by said means for rejecting neighboring pixels;

means for rejecting a maximum color value and a minimum color value contained in each of the lists;

means for setting a penultimate maximum value equal to a remaining maximum value in each of the lists; and means for setting a penultimate minimum value equal to a remaining minimum value in each of the lists.

16. The system of claim 15, wherein said estimating means comprises:

means for adding the penultimate maximum value to the penultimate minimum value for each foreground color component of the neighboring pixels which were not rejected by said means for rejecting neighboring pixels to obtain a color value sum for each color component of the neighboring pixels; and means for subtracting a color value for each retrieved color component of the silhouette edge pixel from the corresponding color value sum for each color component of the neighboring pixels to obtain a difference value for each color component for use in estimating a color value for a corresponding background color component of the silhouette edge pixel.

17. The system of claim 12, further comprising:

means for accessing the frame buffer to retrieve a coverage value of the silhouette edge pixel;

wherein said means for generating an output color for the edge pixel further comprises means for performing the following calculations: retrieved silhouette edge pixel coverage value*retrieved silhouette edge pixel color)+ (1-retrieved silhouette edge pixel coverage value) *estimated background color.

18. A system for antialiasing an internal edge and a silhouette edge, the internal edge representing coincident edges of same-surface polygons which edges are not coincident with an edge of the same-surface, the silhouette edge representing an edge of a polygon which is coincident with an edge of a surface on which the polygon is located, comprising:

a blend unit for antialiasing an internal edge, comprising:
same surface determining means for determining if a new polygon being rendered and an existing polygon stored in said frame buffer are in a same surface; and
internal edge antialiasing means for antialiasing an internal edge pixel comprising:
means for generating a new coverage value for the internal edge pixel comprising means for summing a coverage value of the new polygon for the internal edge pixel and a coverage value of the existing polygon for the internal edge pixel as stored in a frame buffer entry of the frame buffer;
means for storing the new internal edge pixel coverage value in the frame buffer entry;
means for generating a new internal edge pixel color value by averaging a color value of a portion of the new polygon which falls within the internal edge pixel and a color value of a portion of the existing polygon which falls within the internal edge pixel proportional to respective coverage values of the new polygon and the existing polygon; and
means for storing the new internal edge pixel color value in said frame buffer entry; and
a frame buffer for receiving pixel information from said blend unit.

19. The system of claim 18, wherein said same surface determining means comprises:

means for determining a Z-range of the portion of new polygon which falls within the internal edge pixel by reference to a Z value and a delta Z value associated with the portion of the new polygon;
means for determining a Z-range of the portion of the existing polygon which falls within the internal edge pixel by reference to a Z value and a delta Z value associated with the portion of the existing polygon; and
means for determining that the portion of the new polygon and the portion of the existing polygon are in the same surface if the Z-range of the portion of the new polygon overlaps with the Z-range of the portion of the existing polygon.

20. The system of claim 18, wherein said blend unit further comprises:

means for determining whether the portion of the new polygon is in a surface which is in front of a surface containing the portion of the existing polygon if it is determined that the portion of the new polygon and the portion of the existing polygon are not in the same surface;
means for storing a coverage value and a color value of the portion of new polygon in the frame buffer entry associated with the internal edge pixel if the portion of the new polygon is in surface which is in front of a surface containing the portion of the existing polygon; and
means for rejecting information associated with the portion of the new polygon if the portion of the new polygon is not in the surface which is in front of a surface containing said existing polygon and is not in the same surface.

21. The system of claim 18, further comprising a video interface comprising:

means for retrieving a color for a silhouette edge pixel from the frame buffer;
means for estimating a background color of the silhouette edge pixel based on colors of neighboring pixels which are proximate to the silhouette edge pixel; and
means for interpolating between the retrieved color and the estimated background color to determine an output color of silhouette edge pixel.

* * * * *